US008843876B2

(12) United States Patent
Fioritoni et al.

(10) Patent No.: US 8,843,876 B2
(45) Date of Patent: Sep. 23, 2014

(54) METHOD FOR KEEPING A WEB SESSION ALIVE IN A WEB APPLICATION

(75) Inventors: Marco Fioritoni, Genoa (IT); Nadia Giusti, Chiavari (IT)

(73) Assignee: Siemens Aktiengesellschaft, Munich (DE)

( * ) Notice: Subject to any disclaimer, the term of this patent is extended or adjusted under 35 U.S.C. 154(b) by 125 days.

(21) Appl. No.: 13/366,523

(22) Filed: Feb. 6, 2012

(65) Prior Publication Data

US 2012/0204144 A1 Aug. 9, 2012

(30) Foreign Application Priority Data

Feb. 4, 2011 (EP) ...................................... 11153373

(51) Int. Cl.
*G06F 9/44* (2006.01)
*H04L 29/08* (2006.01)

(52) U.S. Cl.
CPC ...................................... *H04L 67/02* (2013.01)
USPC ........... 717/100; 717/102; 717/105; 717/106; 717/109; 717/116; 715/200; 715/273

(58) Field of Classification Search
CPC combination set(s) only.
See application file for complete search history.

(56) References Cited

U.S. PATENT DOCUMENTS

| | | | |
|---|---|---|---|
| 6,550,057 B1 * | 4/2003 | Bowman-Amuah | 717/126 |
| 6,886,169 B2 * | 4/2005 | Wei | 719/316 |
| 6,981,048 B1 * | 12/2005 | Abdolbaghian et al. | 709/228 |
| 7,120,897 B2 * | 10/2006 | Ebbo et al. | 717/108 |
| 2003/0025728 A1 * | 2/2003 | Ebbo et al. | 345/744 |
| 2003/0084120 A1 * | 5/2003 | Egli | 709/218 |
| 2004/0230967 A1 * | 11/2004 | Yuknewicz et al. | 717/170 |
| 2004/0237083 A1 * | 11/2004 | Alcazar et al. | 717/178 |
| 2005/0050164 A1 * | 3/2005 | Burd et al. | 709/217 |
| 2005/0159932 A1 | 7/2005 | Thurner | |
| 2005/0188098 A1 * | 8/2005 | Dunk | 709/232 |
| 2006/0123119 A1 | 6/2006 | Hill et al. | |
| 2007/0100967 A1 * | 5/2007 | Smith et al. | 709/219 |
| 2009/0106769 A1 * | 4/2009 | Nakamura | 719/311 |
| 2010/0251092 A1 * | 9/2010 | Sun | 715/222 |
| 2010/0281118 A1 * | 11/2010 | Donahue et al. | 709/206 |
| 2011/0161506 A1 * | 6/2011 | Dickerson | 709/228 |
| 2011/0161912 A1 * | 6/2011 | Eteminan et al. | 717/101 |

(Continued)

FOREIGN PATENT DOCUMENTS

EP 1670213 A1 6/2006

OTHER PUBLICATIONS

Biros: "Reusable Embedded Keep Session Alive with HTML Helper for ASP.NET MVC 1.0C#", XP-002648566, Jul. 7, 2011, pp. 1-4.

(Continued)

*Primary Examiner* — Chameli Das
(74) *Attorney, Agent, or Firm* — Laurence A. Greenberg; Werner H. Stemer; Ralph E. Locher

(57) ABSTRACT

A method keeps a web session alive for an amount of time allowing to keep a limited amount of data on the Internet information server and manage individually the session timeout characteristics of the web session in the web application. The method automatically refreshes the web pages in the background without any further user interaction. Thereby, a portion of code added effectively creates a hidden postback that keeps alive the session's state. By a class library, the user is enabled at the engineering level to manage a session timeout state and to eliminate a premature timeout thereby eliminating any risk of possible data loss.

6 Claims, 1 Drawing Sheet

(56) References Cited

U.S. PATENT DOCUMENTS

2012/0047272 A1* 2/2012 Dunk ............................ 709/227
2012/0094721 A1* 4/2012 Brondmo et al. ............. 455/566
2013/0014020 A1* 1/2013 Dixon et al. .................. 715/738

OTHER PUBLICATIONS

Sheridan: "Keeping your ASP.NET Session Alive Using jQuery", XP-002648567, Jan. 25, 2010, pp. 1-4.

Kurek: "The Defibrilator: Keeping ASP.NET Session Alive Ad Infinitum", XP-002648568, May 31, 2006, pp. 1-2.

* cited by examiner

METHOD FOR KEEPING A WEB SESSION ALIVE IN A WEB APPLICATION

CROSS-REFERENCE TO RELATED APPLICATION

This application claims the priority, under 35 U.S.C. §119, of European application EP 11 153 373, filed Feb. 4, 2011; the prior application is herewith incorporated by reference in its entirety.

BACKGROUND OF THE INVENTION

Field of the Invention

The present invention relates to a method for keeping a web session alive in a web application.

The present invention can be considered in the context of modern manufacturing processes. Those manufacturing processes are highly automated and may be divided into several hierarchical layers. For example, at the highest level, the enterprise resource planning (ERP) takes place, which may be referred to as a business layer. At lower levels, the hardware implementation and control take place, which may be referred to as various control levels. Industry standard ISA S95 defines an intermediate layer that integrates and connects together business and control layers. That intermediate layer is referred to as manufacturing execution system (MES) that defines an MES process in terms of data and interactions between functions, such as production modeling, production scheduling, resource management, resource allocation, dispatching, data collection and acquisition, quality assurance management, maintenance management, performance analysis, corrective scheduling, document control, labor management and material and production tracking.

In the area of manufacturing execution systems, an extensive line of products, e.g., the SIMATIC® IT product from Siemens AG, Germany, is available for solving a variety of technical tasks. In this context, a broad range of IT solutions exist to connect the actual hardware close to the technical and/or logistical process to the application layer of the client driving the installation. Manufacturing execution systems have therefore been developed to meet all of the requirements of a service oriented architecture (SOA) to integrate seamless into a totally integrated automation (TIA). For example, SIMATIC® IT is the manufacturing execution system in TIA, and SIMATIC® PCS 7 is a process control system suitable for cooperation with a manufacturing execution system.

U.S. patent publication No. 2005/0159932 represents the various levels of a manufacturing process in form of a pyramid. In that representation, the uppermost level is the ERP level, and the lowermost level of the pyramid is the automation/control level, wherein the MES level is the linking level. Programmable logic controllers (PLCs) in conjunction with visualization and process control systems (PCSs) are typically used on the automation level. Individual drives, actuators and sensors used in the production and/or manufacturing facilities are in direct contact with the systems of the automation level.

U.S. patent publication No. 2005/0159932 explains further that an MES system contains a runtime system (RTS) for providing time-based sequence control of the components involved (sub-components, modules, tasks, operating system processes etc.), and an engineering system (ES) for creating and editing programs which are intended for execution in the runtime system. A connection between the runtime system of the control facility (or of the automation system or the MES system) and a technical process is effected by way of inputs/outputs. The programming of the control facility and with it the specification of the behavior of the runtime system is carried out in the engineering system. The engineering system contains tools for configuring, planning and programming machines and controlling technical processes. The programs created in the engineering system are transferred to the runtime system RTS of a target system.

The control programs or installation specifications created by the engineering system are executed on a target system, for example, to control a technical process. The target system includes processors, storage facilities and a runtime system. The ES-created control programs are loaded onto the target system's runtime system. The underlying technical process, e.g., for an MES solution, is controlled via inputs and outputs. Actuators are influenced by the runtime system via the inputs and outputs. The technical process reacts by sending sensor data back to the runtime system via the inputs and outputs for further processing in the application.

Elements used for an installation description, or for a manufacturing or assembly solution (installation parts, installation components, machines, valves etc.) are linked in the engineering phase with meta information or physically contain meta information. Meta information may be information about the elements themselves (e.g., Who is using an element?, With which other elements does it interact?). However, meta information can also comprise knowledge about an application, the business process to be implemented or the entire installation. This type of knowledge is present in the engineering phase (in functional specifications, design specifications or other installation documentation) and simply needs to be incorporated into the elements as meta information. In particular, the markup language XML (Extensible Markup Language) is suitable for describing meta information and linking it with elements.

The MES communicates with the PLCs of the automation layer via at least one software layer (e.g., a batch system). Such a software layer requires maintenance and usually software licenses. In some manufacturing plants, however, the costs for maintenance and licenses may not be economically acceptable.

Further, the client needs to implement its own software programs and application for which the SIMATIC IT® offers a Client Application Builder (CAB) tool that enables the user to customize the SIMATIC IT® software. All other MES software solutions probably will also comprise a user interface allowing the user the customization of the standard-related MES software. In this specific context in particular and in general, a vast kind of data interactions and data handling routine are managed by web applications being incorporated by the CAB tool into the MES software.

In this field, the session state of a web application that is written in Microsoft® ASP.NET is an important variable. In particular, the demand to keep a web session alive for an undefined period of time is a challenging task. The ASP.NET session state enables users to store and retrieve information for themselves or a specific user as the user navigates the different ASP.NET pages that make up the web application. The HTTP protocol is a stateless protocol, implicating that the respective web server treats each HTTP request for a page as an independent request; by default, the web server does not retain any knowledge of variable values used during a previous request. As a result, the creation of web applications that need to maintain some cross-request state information like applications that implement shopping cards, data scrolling, is currently a challenge with the existing software tools. ASP.NET session state identifies requests received form the same browser during a limited period of time as a session, and provides the ability to persist variable values for the duration of that individual session. The Session state is configurable by using the session State element of the system.web configuration section of the web.config file of a web application. The session State element enables users to specify the following options:
 a) the mode in which the session will store data;
 b) the way how session identifier values are sent between the client and the server;
 c) the session Timeout value; and
 d) supporting values that are based on the session mode setting.

Web sessions are identified by a unique identifier that can be read by using the Session ID property. When the session state is enabled for an ASP.NET application, each request for a page in the application is examined for a SessionID value sent from the browser. A session is considered active as long as requests continue to be made with the same SessionID value. If the time between the requests for a particular session exceeds the specified Timeout value in minutes (for example, because the user did not perform any action on the web application), the session is considered expired. The Timeout value that specifies the number of minutes a session can be idle before being abandoned must be a number greater than 0 and lower or equal to 525,600 minutes (1 year) and cannot be undefined. The default value is 20 minutes in this environment.

When a session Timeout value expires, the user is usually disconnected from the web application and redirected to the logging web page. A typical scenario in which a user may wish to remain permanently logged in until he's deliberately logging out include a phone technical support operator. The operator logs into a web application to begin taking calls and modifying data. A phone call may last easily more than one hour with the operator modifying data in-between on a single page, and a session timeout at this point could result in a loss of data for the operator. Another scenario could be the running of a batch procedure (printing, evaluated report) during which users does not need to interact with the web application; the session timeout at this point could also result in a loss of data. To resolve this problem, the user may specify to increase the session Timeout value to several hours.

At the first glance, increasing the session Timeout value in web applications ASP.NET's web.config file should resolve the issue. However, there are actually two main obstacles aligned with this option. The first problem is that setting the Timeout value to anything greater than one hour will result in excessive memory being held on the server, as the Internet Information Server, in which the web application is hosted, holds all session data for thousands of user sessions. The second problem may come upon testing the web application where often the web application will timeout shorter than one hour or even more than one hour.

Another solution to resolve this issue would be to ask the user to refresh their web browser at least, for example, if the session Timeout value is set to 15 minutes, every 15 minutes in order to stay on a single web page that long. For obvious reason, this is a poor solution.

There is, therefore, a need for an improved method to keep a web session in a web application alive for a determinable amount of time allowing to keep a limited amount of data on the Internet Information Server and manage individually the session timeout characterizes of the web session in the web application.

SUMMARY OF THE INVENTION

It is accordingly an object of the invention to provide a method for keeping a web session alive in a web application which overcomes the above-mentioned disadvantages of the prior art methods of this general type.

The objectives are achieved according to the method for keeping a web session alive in a web application, by the steps of:
 a) providing a software tool that offers at least one software-coded mechanism to keep the web session alive, the software tool containing a class library that contains a first part that manages a specific portion of code to be added to a web page of the web application and a second part that manages the responses to requests from a web server that is deriving from the portion of code added to the web page;
 b) at engineering level during the development of a page of the web application, using the class library to assign the desired software-coded mechanism to the web page of the web application, the assignment adds the respective specific portion of code to the web page of said web application; and
 c) at runtime of the web application, executing the specific portion of code added in order to answer the requests from a web server in the dependency of the desired mechanism.

The method therefore allows to automatically refresh the web pages in the background without any further user interaction. Thereby, the portion of code added effectively creates a hidden postback that keeps alive the session's state. By use of the class library, the user is enabled at engineering level to manage the session timeout state and to eliminate a premature timeout thereby eliminating any risk of possible data loss. Further, a single user can be individually and permanently logged to a web application which is rather typical for a longer data entry, or during the execution of longer batch procedures.

For the sake of easy presentation of the library, the class library can be distributed as a dll-file, preferably written with the .NET framework.

Preferably, the desired mechanism can be selected from a mechanism group consisting of: a) an always on mechanism, b) an always off mechanism and c) an activate/deactivate mechanism related to an event, i.e. a specific button click. In particular, the last mentioned option is enabling the user who customizes the MES software to connect the keeping alive mechanism to a customizable event.

Typically, in the ASP.NET environment, the first part of the library is a class library which can be distributed as assembly in the .dll form. Further, the specific portion of code may use a JAVASCRIPT® code and/or the second part may be configured as a Hypertext Transfer Protocol (HTTP) handler.

Other features which are considered as characteristic for the invention are set forth in the appended claims.

Although the invention is illustrated and described herein as embodied in a method for keeping a web session alive in a web application, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
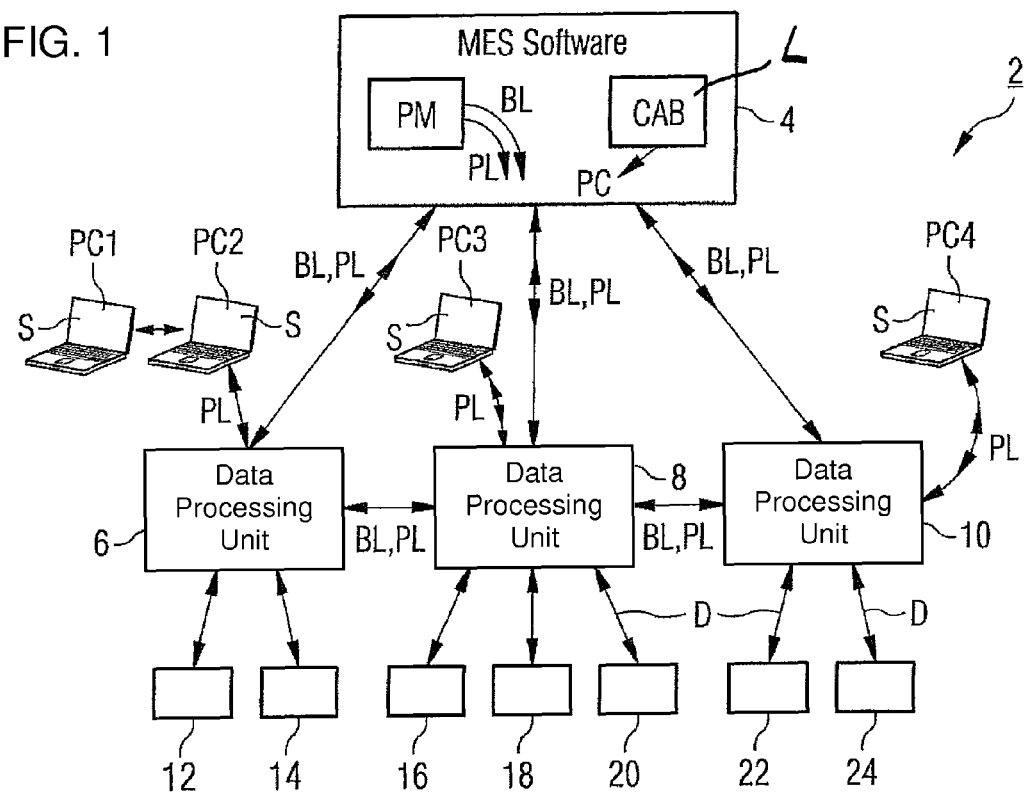
FIG. 1 is a schematic illustration of one embodiment of a production execution system according to the invention.

Referring now to the figures of the drawing in detail and first, particularly, to FIG. 1 thereof, there is shown a schematic overview of a plant control system 2 working as a manufacturing execution system (MES). The system/network 2 contains a number of data processing units 4, 6, 8, 10 running MES software for controlling and/or monitoring a production process operating a number of production components 12 to 24. The production components 12 to 24 can be sensors, actuators, motors, step drives, conveyors, valves, pumps and the like. The data processing units 4 to 10 are network computers which typically contain logical units, calculation devices, storage devices, display devices and the like. The data processing units 4 to 10 are connected within a plant network in order to exchange data to the required extent. Usually, this connection is achieved by a W-LAN or cable-born Ethernet connections. One of the data processing units, hereinafter referred to a master console 4, is executing the MES software for controlling and monitoring the operation of the plant.

The master console 4 contains within the MES software a production modeler PM. The production modeler PM is enabled to define a business logic BL within a fully graphical environment as facilitated by the MES software. The business logic BL, when finally generated by the production modeler, contains a plant model of the production process and the related operating procedures for the production components 12 to 24 in a fully graphical environment. Even for the creation of the business logic BL high-level graphical language is used within the MES software, preferably consistently with the ISA-95 standard.

The master console 4 further contains a client application builder CAB within the MES software being enabled to provide a native, WEB based graphical user interface for various purposes. One purpose is for generating cross-functionality graphic screens S, the screens forming part of the network 2 as presentation clients PC, PC1 to PC4 and displaying data D which is stemming from the production components 12 to 24 and which is manipulated from the business logic BL by the production modeler PM, where it is required, i.e. when the data stemming from one of the production components 12 to 24 has to be further processed or averaged with data stemming from other production components. In general, the client application builder CAB within the Simatic IT® software suite provides a CAB Engineering module that offers an Visual Studio .NET environment where the CAB application are developed by the user. Further, the client application builder CAB contains a CAB Web Server where CAB applications (those developed with the CAB Engineering environment) are executed upon request of an user. Furthermore, the CAB server comprised in the client application builder takes care for exchanging data with the various SIMATIC IT® data sources and with the client side. And last but not least the client application builder CAB contains a CAB client which requires, by use of a Web browser, typically a resource (for example, the display of a set of data) to the CAB Web Server. On the CAB Web Server, two web applications are installed, on the one hand the SIMATIC IT® portal and the SIMATIC IT® console. These two applications allow the use and visualization of the components also involved in the SIMATIC IT® software suite, such as the production modeler, production scheduler, production tracer and so on.

The present invention now relates to the context that the client application builder CAB provides the interface to create web applications and customize user programs consistently implemented within the MES software or stemming from external sources.

In the context of the present invention, the client application builder CAB is also used to provide a method for keeping a web session in a web application alive for a customizable period of time. During the developing phase of the web application, the CAB provides to the user a dedicated library L containing various mechanism to keep a web session for the current web page alive.

By selecting one of these mechanism, the user can for example decide to keep the web session always alive or to activate/deactivate the web session related to an event (for example, a button click). The library which is distributed as a .dll file over the network 2 contains thereby two main parts. The first part is a class part offering software-coded mechanisms used later during execution to execute the desired keep session alive mechanism. Therefore, this first part also manages to insert the respective JAVASCRIPT® code into the web page program. In the second part an HTTP handler is comprised that answers to the request of the web server, the requests deriving from the JAVASCRIPT® added to the web page. This interaction of the two parts of the .dll-library, it is possible to create a postback running undercover and keep a web session alive according to the parameters determined by the selected mechanism out of the library without performing any additional action of the user on the respective web page.

The main advantage of the present solution is to provide ways to the user to manage session timeout according to the demands of his task with respect to a distinct web page. It is now up to user to decide whether he would like to avoid a session timeout at all and avoid the loss of data that usually happens when a session is timed out. Moreover, the solution also enables the user to remain permanently logged to the web application which is a rather typical situation for long data entry process or during the execution of long-lasting batch procedures.

The .dll-library L is distributed as an assembly, written in this example with the .NET Framework 3.5, registered into the Global Assembly Cache (GAC) and named SITCAB-.KeepSessionAlive.dll which is part of the SIMATIC IT® Client Application Builder (CAB). The library contains the KeepSessionAlive class with the following mechanism:
  public static void Set (System.Web.UI.Page page)
  "Activate the mechanism to keep session alive for the current page in which it is implemented and generate a postback";
  public static void (System.Web.UI.Page page)
  De-activate the mechanism to keep the web session alive";
  public static bool Status (System.Web.UI.Page page)
  "Return the current state about the activation (or not) of the mechanism described above",
  public static void run (System.Web.UI.Page page)
  "Execute the mechanism selected to keep the web session alive",
  public static void Run (System.Web.UI.Page page, bool status)
  "This method applies the mechanism to keep the web session alive and must be presented into the Page_Load event of the web application's web page in which users want to manage the session alive with the methods Set/Reset".

Figure 2:
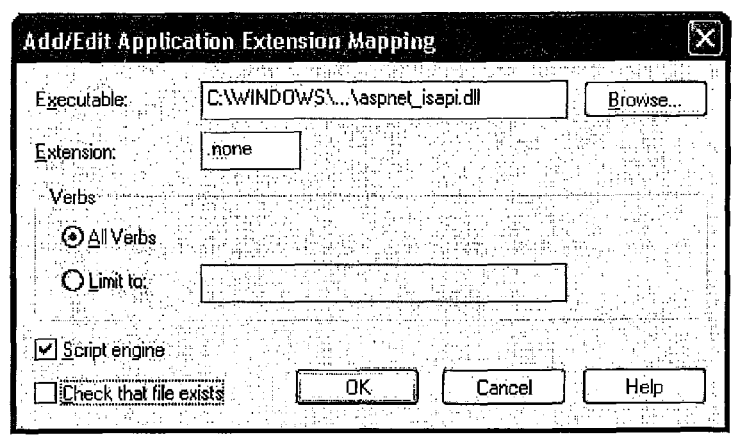
FIG. 2 is a screen-shot for illustrating the correct behavior of a .dll-library in order to manage a keep web session alive parameter within a Client Application Builder shown in FIG. 1.

For the correct behavior of the .dll-library, it is also necessary to configure the web application's Internet Information Server (IIS) mapping "none" as shown in FIG. 2. The HTTP handler, included in the .dll-library, must be associated to the default extension "none" and configured into the web application config's section <httpHandlers> in the following way:

```
<add verb="*" path="*.none" validate="false"
type="Siemens.SimaticIT.CAB.HoldHandler,
SITCAB.KeepSessionAlive,
Version=6.5.0.0, Culture=neutral,
PublicKeyToken=A25DDDB%F077262E"/>
```

EXAMPLE 1

To enable, for the current web page, the mechanism to keep session alive, user has to write the following code:

```
protected void Page_Load( object sender, EventArgs e )
{
KeepSessionAlive.Run( this, true);
...
}
```

EXAMPLE 2

To enable the mechanism to keep session alive based on an event, here the click (ON/OFF) of a web page's button. When the button is clicked, the state changes and the page is reloaded. When the state is ON, the session remains always alive, when the state is OFF, session remains alive in accordance with the timeout parameter configured.

```
protected void Page_Load( object, sender, EventArgs e )
{
KeepSessionAlive.Run( this );
...
}
protected void Button1_Click( object sender, EventArgs e )
{
If( !KeepSessionAlive.Status( this ) )
    KeepSessionAlive.Set( this );
Else
    KeepSessionAlive.Reset( this );
}
```

This method therefore allows to automatically refresh the web pages in the background behind the normal operation without any further user interaction. Thereby, the portion of code added effectively creates a hidden postback that keeps alive the session's state. By the class library, the user is enabled at engineering level to manage the session timeout state and to eliminate a premature timeout thereby eliminating any risk of possible data loss. Further, a single user can be individually and permanently logged to a web application which is rather typical for a longer data entry, or during the execution of longer batch procedures. In particular, the second example offers the user during runtime the possibility to activate or deactivate the web session always alive state by creating during the engineering phase the respective button which enables the web page to be in the session alive state upon clicking this button/switch in the runtime environment. Therefore, refresh mechanism established by this invention is individually establishable for customer application and is not provided in the general purpose as currently available within the ASP.NET framework. It has to be mentioned that the general idea of the present invention does not depend from the software framework used in this context.

The invention claimed is:

1. A method for keeping a web session alive in a web application, which comprises the steps of:
providing a software tool that offers at least one software-coded mechanism to keep the web session alive, the software tool having a library containing a first part for managing a specific portion of JAVASCRIPT code to be added to a web page of the web application and a second part for managing responses to requests from a web server that is deriving from a portion of the code added to the web page, the second part being configured as a Hypertext Transfer Protocol (HTTP) handler;
at an engineering level during development of a page of the web application, with a data processing unit executing software with a logical unit, using the library to assign a mechanism selected by a user of the software tool to keep the web session alive to the page of the web application, wherein an assignment adds a respective specific portion of JAVASCRIPT code to the web page of the web application; and
at runtime of the web application, an interaction between the first part and the second part of the library creating a postback running undercover and keeping a web session alive according to parameters determined by the mechanism selected by the user out of the library without performing any additional action of the user on the respective web page.

2. The method according to claim 1, wherein the library is distributed as a dll-file.

3. The method according to claim 1, which further comprises selecting the mechanism from a mechanism group consisting of: an always on mechanism, an always off mechanism and an activate/deactivate mechanism related to an event.

4. The method according to claim 1, wherein the first part of the library is a class library.

5. The method according to claim 1, wherein the library is distributed as a dll-file and written with a .NET framework.

6. The method according to claim 3, wherein the event is a specific button click.

* * * * *